(12) United States Patent
Kiyoshima et al.

(10) Patent No.: US 8,842,627 B2
(45) Date of Patent: Sep. 23, 2014

(54) RADIO BASE STATION AND MOBILE COMMUNICATION METHOD

(75) Inventors: Kohei Kiyoshima, Kawasaki (JP); Naoto Okubo, Yokosuka (JP); Hiroyuki Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 212 days.

(21) Appl. No.: 13/582,618

(22) PCT Filed: Mar. 3, 2011

(86) PCT No.: PCT/JP2011/054930
§ 371 (c)(1),
(2), (4) Date: Nov. 8, 2012

(87) PCT Pub. No.: WO2011/108651
PCT Pub. Date: Sep. 9, 2011

(65) Prior Publication Data
US 2013/0051337 A1    Feb. 28, 2013

(30) Foreign Application Priority Data

Mar. 4, 2010  (JP) ................................. 2010-047880

(51) Int. Cl.
*H04W 4/00* (2009.01)
*H04L 5/00* (2006.01)
*H04W 72/12* (2009.01)

(52) U.S. Cl.
CPC ............. *H04L 5/001* (2013.01); *H04L 5/0037* (2013.01); *H04W 72/12* (2013.01)
USPC ....................................................... 370/329

(58) Field of Classification Search
USPC .................................. 370/208–210, 328–339
See application file for complete search history.

(56) References Cited

U.S. PATENT DOCUMENTS

| 8,681,724 B2 * | 3/2014 | Du et al. ........................ 370/329 |
| 2010/0220652 A1 | 9/2010 | Ishii et al. |
| 2011/0038264 A1 | 2/2011 | Ishii |
| 2011/0103332 A1 * | 5/2011 | Kuo .............................. 370/329 |
| 2013/0010716 A1 * | 1/2013 | Dinan ........................... 370/329 |
| 2013/0136015 A1 * | 5/2013 | Ojala et al. .................... 370/252 |

FOREIGN PATENT DOCUMENTS

| WO | 2006/118434 A1 | 11/2006 |
| WO | 2007/072936 A1 | 6/2007 |
| WO | 2008/156064 A1 | 12/2008 |
| WO | 2009/116497 A1 | 9/2009 |

OTHER PUBLICATIONS

International Search Report w/translation from PCT/JP2011/054930 mailed on Apr. 5, 2011 (4 pages).

(Continued)

*Primary Examiner* — Frank Duong
(74) *Attorney, Agent, or Firm* — Osha Liang LLP

(57) ABSTRACT

A radio base station (eNB) according to the present invention includes: a management unit (11) configured to manage the number of mobile stations UE corresponding to each carrier; and a scheduling unit (12) configured to perform a scheduling processing to a scheduling-target mobile station (UE#A), in which the "CA" is set to be performed, in at least one of a primary carrier (carrier #1) and a secondary carrier (carrier #2) of the mobile station UE#A based on the number of mobile stations UE corresponding to each carrier.

7 Claims, 5 Drawing Sheets

(56) References Cited

OTHER PUBLICATIONS

Espacenet Abstract of Publication No. WO2007072936 A1 dated Jun. 28, 2007 (1 page).
3GPP TS 36.211 V8.3.0, "3rd Generation Partnership Project; Technical Specification Group Radio Access Network; Evolved Universal Terrestrial Radio Access (E-UTRA); Physical Channels and Modulation" (Release 8) May 2008 (77 pages).
3GPP TR 36.913 V8.0.1, "3rd Generation Partnership Project; Technical Specification Group Radio Access Network; Requirements for further advancements for Evolved Universal Terrestrial Radio Access (E-UTRA); (LTE-Advanced)" (Release 8) Mar. 2009 (15 pages).
3GPP TS 36.101 V8.2.0, "3rd Generation Partnership Project; Technical Specification Group Radio Access Network; Evolved Universal Terrestrial Radio Access (E-UTRA); User Equipment (UE) radio transmission and reception" (Release 8) May 2008 (66 pages).

* cited by examiner

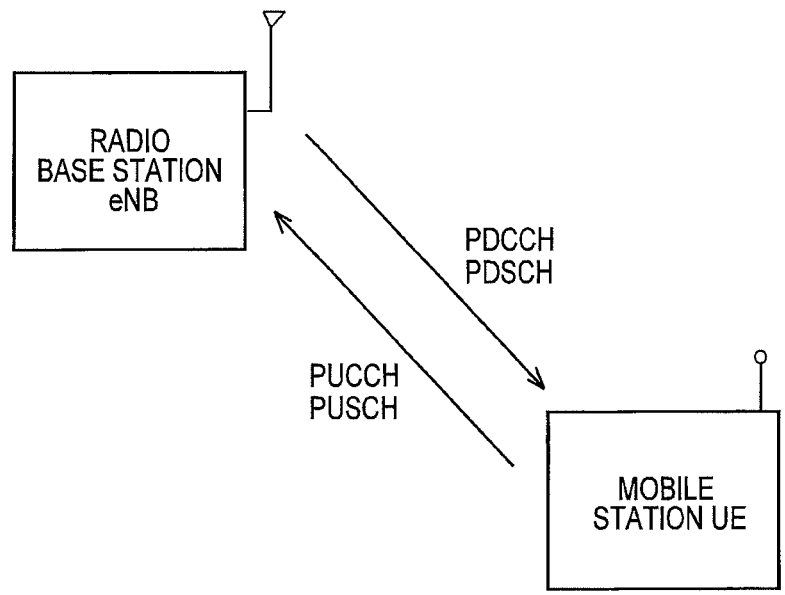
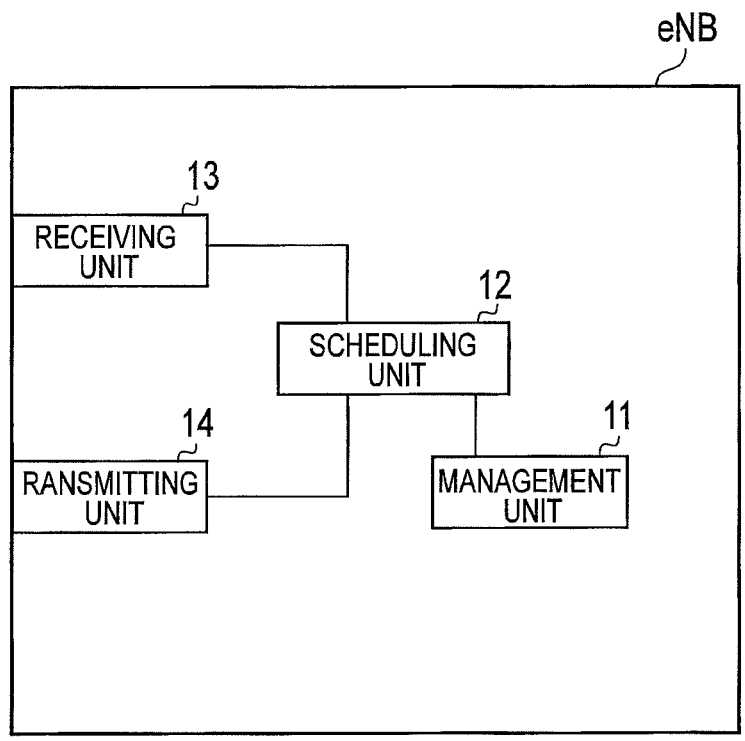

FIG. 3
(a)
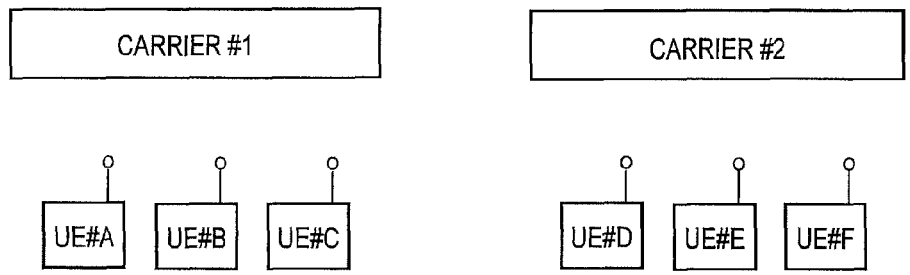
(b)
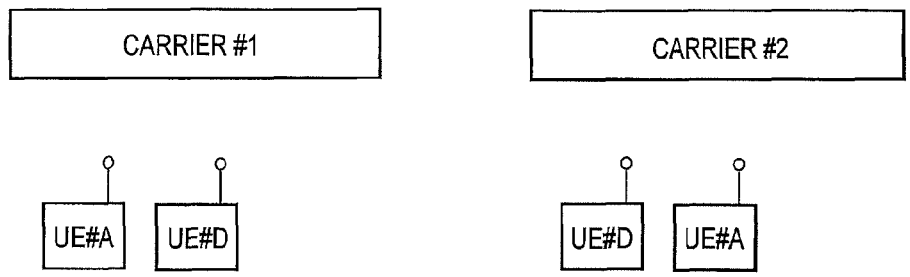

FIG. 4
(a)
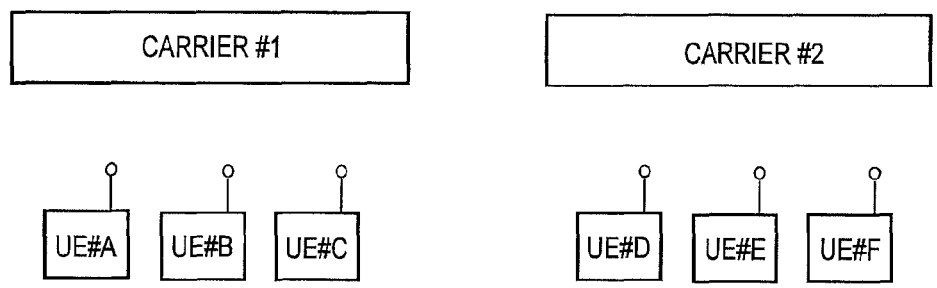
(b)
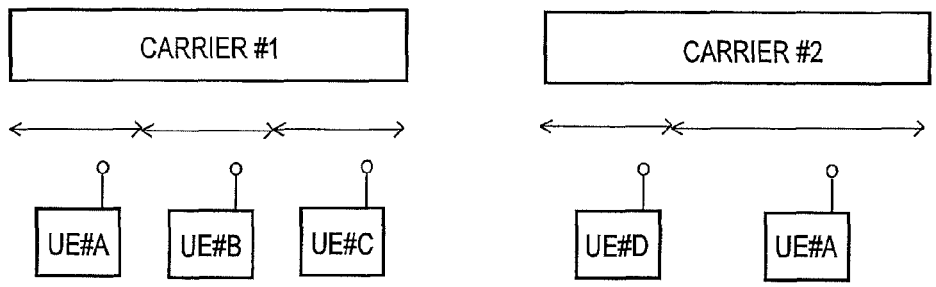

FIG. 5
(a)
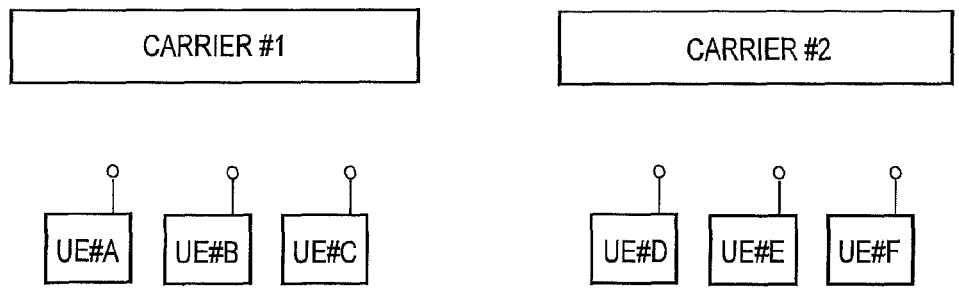
(b)
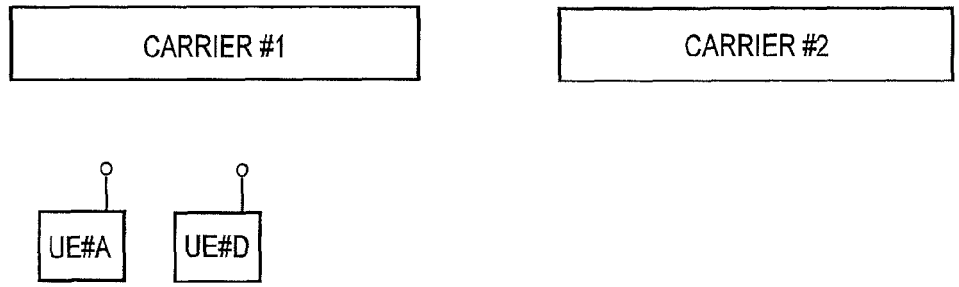

RADIO BASE STATION AND MOBILE COMMUNICATION METHOD

TECHNICAL FIELD

The present invention relates to a technical field of mobile communication, particularly to a radio base station and a mobile communication method in a mobile communication system used in a next-generation mobile communication technology.

BACKGROUND ART

A standardization-setting organization 3GPP of WCDMA (Wideband Code Division Multiplexing Access) is studying and specifying a communication system that succeeds a "WCDMA system", an "HSDPA (High-Speed Downlink Packet Access) system", an "HSUPA (High-Speed Uplink Packet Access) system", and the like, namely, an "LTE (Long Term Evolution) system".

In a radio access system of the LTE system, an "OFDMA (Orthogonal Frequency Division Multiplexing Access) system" is defined for a downlink, and an "SC-FDMA (Single-Carrier Frequency Division Multiple Access) system" is defined for an uplink (for example, see Non-Patent Literature 1).

The OFDMA system is a "multicarrier transmission system", which is configured such that each frequency band (carrier) is divided in plural narrow frequency bands (sub-carriers) and communication is performed using each narrow frequency band (sub-carrier). According to the OFDMA system, the sub-carriers are closely arrayed while orthogonalizing in a frequency axis, so that it is expected that high-speed transmission can be implemented to enhance a use efficiency of a frequency.

The SC-FDMA system is a "single-carrier transmission system", which is configured such that the frequency band (carrier) of one carrier frequency is allocated to each of plural mobile stations UE (user devices) and the communication is performed using the carrier. According to the SC-FDMA system, an influence of interference between the mobile stations UE can be simply and effectively reduced, and a fluctuation in transmission power can be decreased. Accordingly, the SC-FDMA system is suitable from the viewpoint of low power consumption of the mobile station UE and coverage enlargement.

In the LTE system, the plural mobile stations UE are configured such that the communication is performed while one or at least two physical channels are shared by the mobile stations UE in both the uplink and the downlink.

The channel shared by the mobile stations UE is generally called a "shared channel". In the LTE system, the shared channel is called a "PUSCH (Physical Uplink Shared Channel)" in the uplink, and the shared channel is called a "PDSCH (Physical Downlink Shared Channel)" in the downlink.

For a transport channel, the shared channel is called a "UL-SCH (Uplink Shared Channel)" in the uplink, and the shared channel is called a "DL-SCH (Downlink Shared Channel)" in the downlink.

In the mobile communication system in which the shared channel is used, it is necessary to select to which mobile station UE the shared channel is allocated in each sub-frame (in the LTE system, 1 ms), and it is necessary to transmit a signal that the shared channel is allocated to the selected mobile station UE.

In the LTE system, a control channel used to transmit the signal is called a "PDCCH (Physical Downlink Control Channel)" or a "DL L1/L2 Control Channel (Downlink L1/L2 Control Channel)".

The processing of selecting to which mobile station UE the shared channel is allocated in each sub-frame as described above is generally called "scheduling". The expression that "the shared channel is allocated" may be expressed as "a radio resource is allocated for the shared channel".

Examples of information transmitted by the PDCCH include "downlink scheduling information" and "uplink scheduling grant".

Examples of the "downlink scheduling information" include allocation information on a downlink resource block related to the downlink shared channel, information on a UE-ID, the number of streams, or a precoding vector, and information on a data size, a modulation system, or a HARQ (hybrid automatic repeat request).

Examples of the "uplink scheduling grant" include information on an uplink resource block related to the uplink shared channel, information on the UE-ID, the data size, the modulation system, or an uplink transmission power, and information on a demodulation reference signal in an uplink MIMO.

The "downlink scheduling information" and the "uplink scheduling grant" may collectively be called DCI (Downlink Control Information).

The 3GPP studies an LTE-advanced system that is of the communication system succeeding the LTE system. Requirements of the LTE-advanced system are summarized in Non-Patent Literature 2.

That "CA (Carrier Aggregation)" is performed is agreed as one of the requirements in the LTE-advanced system. The "CA" is a technology of performing simultaneous communication between the mobile station UE and the radio base station using a "CC (Component Carrier)" that is of the plural carriers having different carrier frequencies.

For example, in the case that the "CA" is set to be performed in the uplink, the mobile station UE is configured to be able to transmit an uplink signal using the plural "CCs", and the radio base station eNB is configured to be able to receive the uplink signal using the plural "CCs".

For example, in the case that the "CA" is set to be performed in the downlink, the radio base station eNB is configured to be able to transmit a downlink signal using the plural "CCs", and the mobile station UE is configured to be able to receive the downlink signal using the plural "CCs".

CITATION LIST

Non-Patent Literature

Non-Patent Literature 1: 3GPP TS36.211 (V8.3.0), "Physical Channels and Modulation", May, 2008

Non-Patent Literature 2: 3GPP TS36.913 (V8.0.1), "Requirement for further advancements for Evolved Universal Terrestrial Radio Access (E-UTRA) (LTE-advanced)"

Non-Patent Literature 3: 3GPP TS36.101 (V8.2.0), "E-UTRA UE radio transmission and reception"

However, when the "CA" is set to be performed in the LTE-advanced system, unfortunately it is not defined how the radio base station eNB should perform scheduling processing.

The present invention has been made in view of the above problem, and an object of the invention is to provide a radio base station and a mobile communication method, which can effectively perform the scheduling processing when the "CA" is set to be performed.

SUMMARY OF THE INVENTION

A first aspect of the present invention is summarized as a radio base station configured to be able to perform communication with a mobile station using a primary carrier and a secondary carrier which have different carrier frequencies, the radio base station including: a management unit configured to manage the number of mobile stations corresponding to each carrier; and a scheduling unit configured to perform a scheduling processing to a scheduling-target mobile station, in which the communication is set to be performed, in at least one of the primary carrier and the secondary carrier of the scheduling-target mobile station, based on the number of mobile stations corresponding to each carrier.

A second aspect of the present invention is summarized as a mobile communication method for performing communication between a radio base station and a mobile station using a primary carrier and a secondary carrier which have different carrier frequencies, the mobile communication method including a step of: performing, at the radio base station, a scheduling processing to a scheduling-target mobile station, in which the communication is set to be performed, in at least one of the primary carrier and the secondary carrier of the scheduling-target mobile station based on the number of mobile stations corresponding to each carrier.

As described above, the invention can provide the radio base station and the mobile communication method, which can effectively perform the scheduling processing when the "CA" is set to be performed.

BRIEF DESCRIPTION OF DRAWINGS

FIG. 1 is an entire configuration diagram of a mobile communication system according to a first embodiment of the invention.

FIG. 2 is a functional block diagram of a radio base station according to the first embodiment of the invention.

FIG. 3 is a view illustrating a scheduling method performed by the radio base station according to the first embodiment of the invention.

FIG. 4 is a view illustrating the scheduling method performed by the radio base station according to the first embodiment of the invention.

FIG. 5 is a view illustrating the scheduling method performed by the radio base station according to the first embodiment of the invention.

DETAILED DESCRIPTION OF EMBODIMENTS

Figure 6:
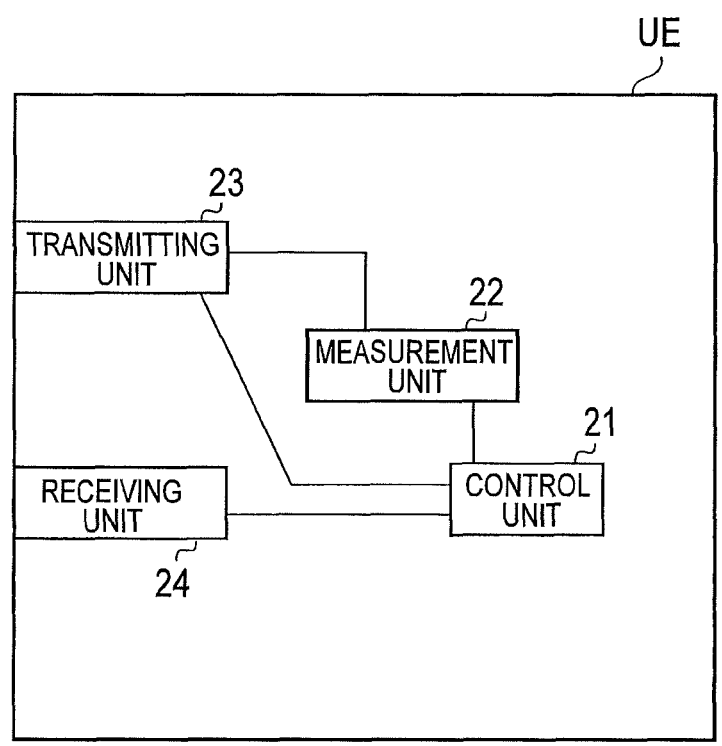
FIG. 6 is a functional block diagram of a mobile station according to the first embodiment of the invention.

Mobile Communication System according to First Embodiment of the Invention

Hereinafter, a mobile communication system according to a first embodiment of the invention will be described with reference to the drawings. In the drawings for explaining the first embodiment, components having the same functions are designated by the same reference signs, and the overlapping description is omitted.

The mobile communication system of the first embodiment will be described with reference to FIGS. 1 to 6. As illustrated in FIG. 1, the mobile communication system of the first embodiment includes a radio base station eNB and a mobile station UE that can perform communication with the radio base station eNB.

For example, the LTE (also called Evolved UTRA and UTRAN, or Super 3G) system or the LTE-advanced system is applied to the mobile communication system of the first embodiment.

As a radio access system in the mobile communication system of the first embodiment, the "OFDMA system" is applied to the downlink, and the "SC-FDMA system" is applied to the uplink.

The mobile communication system of the first embodiment is configured so as to be able to perform the "CA". Specifically, in the case that the mobile communication system of the first embodiment is set so as to perform the "CA", the mobile communication system is configured to be able to perform communication using the plural "CCs" in the uplink and the downlink.

At this point, the "CC" corresponds to one system carrier in the LTE system. That is, although the communication is performed using one "CC" in the LTE system, the communication may be performed using the plural "CCs" in the LTE-advanced system.

The channels used in the LTE system and the LTE-advanced system will be described below.

The PDSCH and the PDCCH, which are shared by the mobile stations UE, are used in the downlink. At this point, user data of the downlink, namely, a normal data signal of the downlink is transmitted by the PDSCH.

The data signal may include best-effort packet data, streaming packet data, a control signal, and a voice signal over a VoIP (Voice over IP) or the like.

The best-effort packet data includes packet data for transmitting and receiving a mail and packet data for browsing the Web.

For example, the control signal is an RRC message. The control signal may be mapped and transmitted by a "DCCH (Dedicated Control Channel)" that is of a logical channel.

Using the PDCCH, the radio base station eNB notifies, to the mobile station UE, the ID of the mobile station UE that performs the communication using the PDSCH, information (that is, down scheduling information) on a transport format of the downlink user data, the ID of the mobile station UE that conducts the communication using the PUSCH, and information (that is, up scheduling information) on a transport format of the uplink user data.

The PDCCH may be called a "downlink L1/L2 control channel".

The PUSCH and a PUCCH (Physical Uplink Control Channel), which are shared by the mobile stations UE, are used in the uplink.

As illustrated in FIG. 2, the radio base station eNB includes a management unit 11, a scheduling unit 12, a receiving unit 13, and a transmitting unit 14.

The management unit 11 is configured to manage the number of mobile stations UE corresponding to each carrier (each CC).

For example, the management unit 11 may be configured to manage, as the number of mobile stations UE corresponding to each carrier, the number of mobile stations UE (that is, the number of "RRC connected mobile stations UE") in each of which an RRC connection is set in each carrier, the number of mobile stations UE of scheduling target candidates in each carrier, the number of mobile stations UE in each of which the uplink user data is stored in a transmission buffer in each carrier, the number of the mobile stations UE each of which is in an active state in each carrier, or the number of mobile stations UE each of which is in a non-DRX (non-Discontinuous Reception) state in each carrier.

In the case that the "CA" is not set to be performed, the scheduling unit 12 is configured to perform the scheduling processing to the scheduling-target mobile station UE in a primary carrier (main carrier) of the scheduling-target mobile station UE.

In the case that the "CA" is set to be performed, the scheduling unit 12 is configured to perform the scheduling processing to the scheduling-target mobile station UE in at least one of the primary carrier and an secondary carrier of the scheduling-target mobile station UE based on the number of mobile stations UE corresponding to each carrier, which is managed by the management unit 11.

As used herein, the primary carrier means what is called an "anchor carrier", and the secondary carrier means carriers (CCs) except the anchor carrier.

The anchor carrier may be defined as a carrier in which a PDCCH signal in the plural "CCs" is transmitted, a carrier in which a PHICH (Physical HARQ Indicator Channel) signal is transmitted, a carrier in which a "semi-persistent scheduling" is applied and a PDSCH signal is transmitted, a carrier in which the "semi-persistent scheduling" is applied and the PHICH signal is transmitted in response to a PUSCH signal, a carrier in which a paging signal is transmitted, a carrier in which a DCCH signal is transmitted, or a carrier in which measurement is performed. Alternatively, the anchor carrier may be defined as a combination of the above definitions.

For example, as illustrated in FIG. 3(a), the scheduling unit 12 may be configured to perform the scheduling processing to a scheduling-target mobile station UE#A only in the primary carrier (carrier #1) of the scheduling-target mobile station UE#A, when determining that the number of mobile stations UE corresponding to the primary carrier (carrier #1) and the secondary carrier (carrier #2) of the scheduling-target mobile station UE#A is greater than a predetermined threshold (that is, during a crowded condition).

On the other hand, as illustrated in FIG. 3(b), the scheduling unit 12 may be configured to separately perform the scheduling processing to the scheduling-target mobile station UE#A in the primary carrier (carrier #1) and the secondary carrier (carrier #2) of the scheduling-target mobile station UE#A, when determining that the number of mobile stations UE corresponding to the primary carrier (carrier #1) and the secondary carrier (carrier #2) of the scheduling-target mobile station UE#A is less than the predetermined threshold (that is, during a non-crowded condition).

Alternatively, as illustrated in FIG. 4(a), the scheduling unit 12 may be configured to perform the scheduling processing to the scheduling-target mobile station UE#A only in the primary carrier (carrier #1) of the scheduling-target mobile station UE#A, when determining that the number of mobile stations UE corresponding to the secondary carrier (carrier #2) of the scheduling-target mobile station UE#A is greater than the predetermined threshold (that is, during the crowded condition).

On the other hand, as illustrated in FIG. 4(b), the scheduling unit 12 may be configured to perform the scheduling processing to the scheduling-target mobile station UE#A in the secondary carrier (carrier #2) of the scheduling-target mobile station UE#A after performing the scheduling processing in the primary carrier (carrier #1) of the scheduling-target mobile station UE#A, when the scheduling unit 12 determines that the number of mobile stations UE corresponding to the secondary carrier (carrier #2) of the scheduling-target mobile station UE#A is less than the predetermined threshold (that is, during the non-crowded condition).

That is, as illustrated in FIG. 4(b), in the case that the mobile station UE#D does not use all resource (RB) in the carrier #2, the scheduling unit 12 can allocate the excess resource (RB) in the carrier #2 to the mobile station UE#A in addition to the resource (RB) in the carrier #1.

In the scheduling processing in the secondary carrier of each mobile station UE, the scheduling unit 12 may be configured to allocate all the resources in the secondary carrier to the mobile station UE having a higher priority, or the scheduling unit 12 may be configured to equally allocate the resources in the secondary carrier to the plural mobile stations UE.

As illustrated in FIG. 5(a), the scheduling unit 12 may be configured to perform the scheduling processing to the scheduling-target mobile station UE#A only in the primary carrier (carrier #1) of the scheduling-target mobile station UE#A, when determining that the number of mobile stations UE corresponding to the primary carrier (carrier #1) and the secondary carrier (carrier #2) of the scheduling-target mobile station UE#A is greater than the predetermined threshold (that is, during the crowded condition).

On the other hand, as illustrated in FIG. 5(b), the scheduling unit 12 may be configured to perform the scheduling processing to the scheduling-target mobile station UE#A while regarding the primary carrier (carrier #1) and the secondary carrier (carrier #2) of the scheduling-target mobile station UE#A as one carrier, when the scheduling unit 12 determines that the number of mobile stations UE corresponding to the primary carrier (carrier #1) and the secondary carrier (carrier #2) of the scheduling-target mobile station UE#A is less than the predetermined threshold (that is, during the non-crowded condition).

That is, as illustrated in FIG. 5(b), the scheduling unit 12 is configured to stop the scheduling processing in one of the carrier #1 and the carrier #2, and to perform the scheduling processing in the other.

In this case, the scheduling unit 12 is configured to regard the resources (RBs) in the carrier #1 and the carrier #2 as the resource (RB) in one carrier, and to perform the scheduling processing.

The scheduling unit 12 may be configured not to perform the "CA" in the uplink, when a propagation situation in the uplink is degraded between the radio base station eNB and the mobile station UE (for example, a pass-loss is large) even in the non-crowded condition.

The receiving unit 13 is configured to receive the PUSCH signal and the PUSCH signal, which are transmitted from the mobile station UE.

In the case that the allocation is performed to the plural "CCs" through the scheduling processing while the "CA" is set to be performed, the receiving unit 13 is configured to receive the signal transmitted from the mobile station UE using the plural "CCs".

On the other hand, in the case that the "CA" is not set to be performed, or in the case that the allocation is performed to one "CC" through the scheduling processing while the "CA" is set to be performed, the receiving unit 13 is configured to receive the signal transmitted from the mobile station UE using the one "CC".

The transmitting unit 14 is configured to transmit the PDSCH signal, the PDCCH signal, and the PHICH signal to the mobile station UE.

In the case that the allocation is performed to the plural "CCs" through the scheduling processing while the "CA" is set to be performed, the transmitting unit 14 is configured to transmit the signal to the mobile station UE using the plural "CCs".

On the other hand, in the case that the "CA" is not set to be performed, or in the case that the allocation is performed to one "CC" through the scheduling processing while the "CA" is set to be performed, the transmitting unit 14 is configured to transmit the signal to the mobile station UE using the one "CC".

As illustrated in FIG. 6, the mobile station UE includes a control unit 21, a measurement unit 22, a transmitting unit 23, and a receiving unit 24.

The control unit 21 is configured to control whether the "CA" is set to be performed in the mobile station UE.

The control unit 21 may be configured to control whether the "CA" is set to be performed in the mobile station UE in response to an instruction through a network, for example, the radio base station eNB or a switching station MME (Mobility Management Entity).

Even if the network issues the instruction to set the "CA" to be performed, the control unit 21 may be configured to control whether the "CA" is set to be performed in the uplink according to the propagation situation (for example, the passloss) in the uplink between the radio base station eNB and the mobile station UE.

The measurement unit 22 is configured to measure wireless quality of the carrier in a cell during the communication and surrounding cell.

For example, the measurement unit 22 may be configured to measure the wireless quality of the plural carriers (the primary carrier and the secondary carrier), even if the control unit 21 decides that the "CA" is not set to be performed.

The measurement unit 22 may be configured to issue the instruction to the transmitting unit 23 to transmit a measurement report including a measurement result measured by the measurement unit 22 to the radio base station eNB.

The transmitting unit 23 is configured to transmit the PUSCH signal and the PUSCH signal to the radio base station eNB.

In the case that the allocation is performed to the plural "CCs" through the scheduling processing while the "CA" is set to be performed, the transmitting unit 23 is configured to transmit the signal to the radio base station eNB using the plural "CCs".

On the other hand, in the case that the "CA" is not set to be performed, or in the case that the allocation is performed to one "CC" through the scheduling processing while the "CA" is set to be performed, the transmitting unit 23 is configured to transmit the signal to the radio base station eNB using the one "CC".

The receiving unit 24 is configured to receive the PDSCH signal, the PDCCH signal, and the PHICH signal, which are transmitted from the radio base station eNB.

In the case that the allocation is performed to the plural "CCs" through the scheduling processing while the "CA" is set to be performed, the receiving unit 24 is configured to receive the signal transmitted from the radio base station eNB using the plural "CCs".

On the other hand, in the case that the "CA" is not set to be performed, or in the case that the allocation is performed to one "CC" through the scheduling processing while the "CA" is set to be performed, the receiving unit 24 is configured to receive the signal transmitted from the radio base station eNB using the one "CC".

According to the mobile communication system of the first embodiment, because the radio base station eNB has a small processing load during the non-crowded condition, the scheduling processing is performed in both the primary carrier and the secondary carrier of the scheduling-target mobile station UE, which allows speed enhancement of peak throughput to be implemented in the scheduling-target mobile station UE with no use of a complicated configuration.

According to the mobile communication system of the first embodiment, the "CA" is not set to be performed during the crowded condition, which allows the processing load to be reduced in the radio base station eNB.

According to the mobile communication system of the first embodiment, the scheduling processing is performed only in the primary carrier, which eliminate necessity to separately manage the data stored in the transmission buffer of the mobile station UE in the primary carrier and the secondary carrier.

The above features of the first embodiment may be expressed as follows.

A first feature of the present embodiment is summarized as a radio base station eNB configured to be able to perform communication with the mobile station UE using the primary carrier and the secondary carrier which have different carrier frequencies (to perform the "CA"), the radio base station eNB including: the management unit 11 configured to manage the number of mobile stations UE corresponding to each carrier; and the scheduling unit 12 configured to perform the scheduling processing to the scheduling-target mobile station UE#A in at least one of the primary carrier (carrier #1) and the secondary carrier (carrier #2) of the mobile station UE#A based on the number of mobile stations UE corresponding to each carrier.

In the first feature of the present embodiment, the scheduling unit 12 may be configured to perform the scheduling processing to the mobile station UE#A only in the primary carrier (carrier #1) of the mobile station UE#A when determining that the number of mobile stations UE corresponding to the primary carrier (carrier #1) and the secondary carrier (carrier #2) of the mobile station UE#A in which the "CA" is set to be performed is greater than a predetermined threshold. The scheduling unit 12 may be also configured to separately perform the scheduling processing to the mobile station UE#A in the primary carrier (carrier #1) and the secondary carrier (carrier #2) of the mobile station UE#A when determining that the number of mobile stations UE corresponding to the primary carrier (carrier #1) and the secondary carrier (carrier #2) of the mobile station UE#A through the scheduling processing is less than the predetermined threshold.

In the first feature of the present embodiment, the scheduling unit 12 may be configured to perform the scheduling processing to the mobile station UE#A only in the primary carrier (carrier #1) of the mobile station UE#A when determining that the number of mobile stations UE corresponding to the secondary carrier (carrier #2) of the mobile station UE#A through the scheduling processing is greater than a predetermined threshold, and the scheduling unit 12 may be configured to perform the scheduling processing to the mobile station UE#A in the secondary carrier (carrier #2) of the mobile station UE#A after the scheduling processing is performed to the mobile station UE#A in the primary carrier (carrier #1) of the mobile station UE#A when determining that the number of mobile stations UE corresponding to the secondary carrier (carrier #2) of the mobile station UE#A through the scheduling processing is less than the predetermined threshold.

In the first feature of the present embodiment, the scheduling unit 12 may be configured to perform the scheduling processing to the mobile station UE#A only in the primary carrier (carrier #1) of the mobile station UE#A when determining that the number of mobile stations UE corresponding to the primary carrier (carrier #1) and the secondary carrier (carrier #2) of the mobile station UE#A through the scheduling processing is greater than a predetermined threshold, and the scheduling unit 12 may be configured to perform the scheduling processing to the mobile station UE#A while regarding the primary carrier (carrier #1) and the secondary carrier (carrier #2) of the mobile station UE#A as one carrier when determining that the number of mobile stations UE corresponding to the primary carrier (carrier #1) and the secondary carrier (carrier #2) of the mobile station UE#A through the scheduling processing is less than the predetermined threshold.

In the first feature of the present embodiment, the number of mobile stations UE corresponding to each carrier may be the number of mobile stations UE in each of which the RRC connection is set in each carrier, the number of mobile stations UE of the scheduling-target candidates in each carrier, the number of mobile stations UE in each of which the data is stored in the transmission buffer in each carrier, the number of mobile stations UE each of which is in the active state in each carrier, or the number of mobile stations UE each of which is in the non-DRX state in each carrier.

In the first feature of the present embodiment, the scheduling unit 12 may be configured to set the "CA" to be performed to each mobile station UE during the non-crowded condition.

A second feature of the present embodiment is summarized as a mobile communication method for performing communication between the radio base station eNB and the mobile station UE using the primary carrier and the secondary carrier which have different carrier frequencies, the mobile communication method including: a step of performing, at the radio base station eNB, the scheduling processing to the scheduling-target mobile station UE#A of the scheduling processing in at least one of the primary carrier (carrier #1) and the secondary carrier (carrier #2) of the mobile station UE#A based on the number of mobile stations UE corresponding to each carrier.

In the second feature of the first embodiment, the "CA" may be set to be performed to each mobile station UE during the non-crowded condition.

Operations of the mobile station UE and the radio base station eNB may be implemented by hardware, a software module executed by a processor, or a combination of the hardware and the software.

The software module may be provided in any storage medium, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to the processor such that the processor can write and read information in and from the storage medium. The storage medium may be integrated in the processor. The storage medium and the processor may be provided in an ASIC. The ASIC may be provided in the mobile station UE and the radio base station eNB. The storage medium and the processor may be provided as a discrete component in the mobile station UE and the radio base station eNB.

Although the invention is described above in detail using the embodiment, it is clear for those skilled in the art that the invention is not limited to the embodiment. Modifications and changes of the invention can be made without departing from the scope of the invention, which is defined by claims. Accordingly, the description of the embodiment is made only by way of example, and the embodiment has no particular limitation to the invention.

INDUSTRIAL APPLICABILITY

As described above, the invention can provide the radio base station and the mobile communication method, which can effectively perform the scheduling processing in the case that the "CA" is set to be performed.

REFERENCE SIGNS LIST eNB Radio base station
UE Mobile station
11 Management unit
12 Scheduling unit
13,24 Receiving unit
14,23 Transmitting unit
21 Control unit
22 Measurement unit

The invention claimed is:

1. A radio base station configured to be able to perform communication with a mobile station using a primary carrier and a secondary carrier which have different carrier frequencies, the radio base station comprising:
   a management unit configured to manage the number of mobile stations corresponding to each carrier; and
   a scheduling unit configured to perform a scheduling processing to a scheduling-target mobile station, in which the communication is set to be performed, in at least one of the primary carrier and the secondary carrier of the scheduling-target mobile station, based on the number of mobile stations corresponding to each carrier, wherein
   the scheduling unit is configured to perform the scheduling processing to the scheduling-target mobile station only in the primary carrier of the scheduling-target mobile station, when determining that the number of mobile stations corresponding to the primary carrier and the secondary carrier of the scheduling-target mobile station is greater than a predetermined threshold, and
   the scheduling unit is configured to separately perform the scheduling processing to the scheduling-target mobile station in the primary carrier and the secondary carrier of the scheduling-target mobile station, when determining that the number of mobile stations corresponding to the primary carrier and the secondary carrier of the scheduling-target mobile station is less than the predetermined threshold.

2. The radio base station according to claim 1, wherein the number of mobile stations corresponding to each carrier is the number of mobile stations in each of which an RRC connection is set in each carrier, the number of mobile stations of scheduling-target candidates in each carrier, the number of mobile stations in each of which the data is stored in a transmission buffer in each carrier, the number of mobile stations each of which is in an active state in each carrier, or the number of mobile stations each of which is in a non-DRX state in each carrier.

3. The radio base station according to claim 1, wherein the scheduling unit is configured to set the communication to be performed to each mobile station during a non-crowded condition.

4. A radio base station configured to be able to perform communication with a mobile station using a primary carrier and a secondary carrier which have different carrier frequencies, the radio base station comprising:
   a management unit configured to manage the number of mobile stations corresponding to each carrier; and a scheduling unit configured to perform a scheduling processing to a scheduling-target mobile station, in which the communication is set to be performed, in at least one of the primary carrier and the secondary carrier of the scheduling-target mobile station, based on the number of mobile stations corresponding to each carrier, wherein the scheduling unit is configured to perform the scheduling processing to the scheduling-target mobile station only in the primary carrier of the scheduling-target mobile station, when determining that the number of mobile stations UE corresponding to the primary carrier and the secondary carrier of the scheduling-target mobile station is greater than a predetermined threshold, and the scheduling unit is configured to perform the scheduling processing to the scheduling-target mobile station while regarding the primary carrier and the secondary carrier of the scheduling-target mobile station as one carrier, when determining that the number of mobile stations corresponding to the primary carrier and the secondary carrier of the scheduling-target mobile station is less than the predetermined threshold.

5. A radio base station configured to be able to perform communication with a mobile station using a primary carrier and a secondary carrier which have different carrier frequencies, the radio base station comprising:

a management unit configured to manage the number of mobile stations corresponding to each carrier; and a scheduling unit configured to perform a scheduling processing to a scheduling-target mobile station, in which the communication is set to be performed, in at least one of the primary carrier and the secondary carrier of the scheduling-target mobile station, based on the number of mobile stations corresponding to each carrier, wherein the scheduling unit is configured to perform the scheduling processing to the scheduling-target mobile station only in the primary carrier of the scheduling-target mobile station, when determining that the number of mobile stations corresponding to the secondary carrier of the scheduling-target mobile station is greater than a predetermined threshold, and the scheduling unit is configured to perform the scheduling processing to the scheduling-target mobile station in the secondary carrier of the scheduling-target mobile station after the scheduling processing is performed to the scheduling-target mobile station in the primary carrier of the scheduling-target mobile station, when determining that the number of mobile stations corresponding to the secondary carrier of the scheduling-target mobile station is less than the predetermined threshold.

6. A mobile communication method for performing communication between a radio base station and a mobile station using a primary carrier and a secondary carrier which have different carrier frequencies, the mobile communication method comprising a step of:

performing, at the radio base station, a scheduling processing to a scheduling-target mobile station, in which the communication is set to be performed, in at least one of the primary carrier and the secondary carrier of the scheduling-target mobile station based on the number of mobile stations corresponding to each carrier, wherein in the step, the radio base station performs the scheduling processing to the scheduling-target mobile station only in the primary carrier of the scheduling-target mobile station, when determining that the number of mobile stations corresponding to the primary carrier and the secondary carrier of the scheduling-target mobile station is greater than a predetermined threshold; and in the step, the radio base station separately performs the scheduling processing to the scheduling-target mobile station in the primary carrier and the secondary carrier of the scheduling-target mobile station, when determining that the number of mobile stations corresponding to the primary carrier and the secondary carrier of the scheduling-target mobile station is less than the predetermined threshold.

7. The mobile communication method according to claim 6, wherein the communication is set to be performed to each mobile station during the non-crowded condition.

* * * * *